US009352986B2

(12) United States Patent
Reinolds

(10) Patent No.: US 9,352,986 B2
(45) Date of Patent: May 31, 2016

(54) DRAIN PAN TREATMENT APPARATUS UTILIZING RECYCLED CONDENSATE WATER

(71) Applicant: Ronald C. Reinolds, Callahan, FL (US)

(72) Inventor: Ronald C. Reinolds, Callahan, FL (US)

(*) Notice: Subject to any disclaimer, the term of this patent is extended or adjusted under 35 U.S.C. 154(b) by 169 days.

(21) Appl. No.: 14/459,698

(22) Filed: Aug. 14, 2014

(65) Prior Publication Data

US 2015/0048034 A1  Feb. 19, 2015

Related U.S. Application Data

(60) Provisional application No. 61/866,595, filed on Aug. 16, 2013.

(51) Int. Cl.
| *C02F 1/50* | (2006.01) |
| *C02F 1/68* | (2006.01) |
| *F24F 13/22* | (2006.01) |
| *C02F 103/02* | (2006.01) |

(52) U.S. Cl.
CPC . *C02F 1/50* (2013.01); *F24F 13/22* (2013.01); *C02F 1/688* (2013.01); *C02F 2103/023* (2013.01); *C02F 2303/20* (2013.01); *F24F 2013/228* (2013.01)

(58) Field of Classification Search
CPC ...... C02F 1/50; C02F 1/688; C02F 2103/023; C02F 2303/20; F24F 13/222; F24F 2003/1675; F24F 2013/227; F24F 2013/228
See application file for complete search history.

(56) References Cited

U.S. PATENT DOCUMENTS

| 2,709,522 | A | 5/1955 | Osborne |
| 3,191,915 | A | 6/1965 | Goettl |
| 4,962,778 | A | 10/1990 | Driskill |
| 5,286,377 | A | 2/1994 | Galvan |
| 5,402,813 | A | 4/1995 | Keen |
| 5,514,344 | A | 5/1996 | D'Agaro |
| 5,664,423 | A | 9/1997 | Akazawa |
| 5,911,742 | A | 6/1999 | Akazawa |
| 5,975,113 | A | 11/1999 | Haining et al. |
| 6,487,867 | B1 | 12/2002 | Herren |
| 6,892,907 | B2 | 5/2005 | Varney |
| 7,392,658 | B1 | 7/2008 | Hardy, III |
| 2010/0176038 | A1* | 7/2010 | Hayas ..................... C02F 1/686 210/96.1 |

* cited by examiner

*Primary Examiner* — Lucas Stelling
(74) *Attorney, Agent, or Firm* — Thomas C. Saitta

(57) ABSTRACT

In or in combination with an evaporative air conditioner system having no external water source delivering water to the air handler unit, the invention is a drain pan treatment apparatus utilizing recycled condensate water to create a chemical solution that is delivered into the drain pan to prevent growth of algae and other microorganisms that may clog the drain port or drain conduit. The drain pan treatment apparatus comprises a diverter connector that directs a small amount of condensate water from the drain conduit or drain pump into a chemical canister containing a soluble solid chemical to create a chemical solution. The chemical solution is then delivered into the drain pan. If the air conditioner system does not include a drain pump, then a drain pump is added to deliver the condensate water to the chemical canister.

20 Claims, 1 Drawing Sheet

DRAIN PAN TREATMENT APPARATUS UTILIZING RECYCLED CONDENSATE WATER

This application claims the benefit of U.S. Provisional Patent Application Ser. No. 61/866,595, filed on Aug 16, 2013, the disclosure of which is incorporated herein by reference.

BACKGROUND OF THE INVENTION

This invention relates generally to methods and systems for treating condensate liquid created in air conditioning equipment which is collected and removed in drain pans and drain conduits, and in particular to such systems wherein a chemical is provided to prevent the growth of algae, mold, mildew or other microorganisms within the drain pan or conduits, which may lead to blockage of the drain system. Water vapor condenses on the cooling coils of an evaporative air conditioner during the air cooling operation. This condensate drips from the cooling coils into a drain pan, also commonly referred to as a drip pan, collection pan or condensate pan, which is positioned beneath the coils within the air handling unit. Typically a drain port and an auxiliary port are provided in the equipment housing, the drain port providing a communication means for condensate liquid to pass from the drain pan into a drain conduit, such that the condensate liquid is easily removed from the drain pan for disposal, with the condensate liquid typically being discharged on the exterior of the building. The outflow may be accomplished by gravity or a pump may be utilized to move the liquid through the drain conduit.

It is not uncommon for microorganisms, primarily algae, to grow within the drain pan or drain conduit. This can lead to blockage of the drain port or the drain conduit. When this occurs, the condensate liquid gathers in the drain pan until it overflows and damages the surrounding floor, wallboard, carpet, etc. To unblock the drain port or the drain conduit, it is known to insert elongated members into the drain conduit to physically remove the blockages.

Other techniques are to blast a jet of pressurized air into the drain conduit or to use a wet vacuum to suction obstructions from the drain conduit.

To prevent the growth of microorganisms in the drain pan and drain conduit of an evaporative air conditioner system, it is known to introduce chemicals into the drain pan. One basic method involves pouring a solution, bleach for example, directly into the drain pan at regular intervals. Another involves placing solid chemical tablets into the drain pan, the solids dissolving over time. More complicated methods involve providing external liquid reservoirs with tubing arranged to deliver small amounts of chemical solution into the drain pan, either upon manual activation or using timer systems. Examples of known systems are shown in U.S. Pat. Nos. 6,892,907, 6,487,867, 5,514,344, 4,962,778 and 2,709,522. These systems require an outside water source to provide water within the air conditioning system.

Periodically dispensing small amounts of a chemical solution into the drain pan is a highly efficient method to maintain the drain system in optimum working order, but since condensate air conditioners do not require connections to the building water system for operation of the air handler unit, the user must buy, transport and store bulky liquid-filled containers of the chemical solution or must mix a solid chemical with water to create the chemical solution. Even more complicated systems may require the addition of a water line to provide the liquid to the treatment system.

It is an object of this invention to address the problems set forth above by providing a condensate drain pan treatment apparatus and method that creates a chemical treating solution from solid form chemicals (blocks, tablets, granules, powders, gels) by recycling condensate water from the drain system itself of a system that has no external water supply, the recycled water being combined with the solid chemical to produce the liquid chemical, which is then delivered into the drain pan in order to treat the entire drain system. It is a further object to provide such an apparatus and method such that the condensate water is automatically treated.

SUMMARY OF THE INVENTION

In an evaporative air conditioner system having no external water source delivering water to the air handler unit, the invention is a drain pan treatment apparatus utilizing recycled condensate water to create a chemical solution that is delivered into the drain pan to prevent growth of algae and other microorganisms that may clog the drain port or drain conduit. In one embodiment the drain pan treatment apparatus comprises a diverter connector or secondary conduit that directs a small amount of condensate water from the drain conduit or drain pump into a chemical canister containing a soluble solid chemical to create a chemical solution. The chemical solution is then delivered into the drain pan. If the air conditioner system does not include a drain pump, then a drain pump is added to deliver the condensate water to the chemical canister. Alternatively, a suction pump may be utilized to draw the small amount of condensate water from the drain conduit or the drain pan to deliver to the chemical canister. Proper metering of the recycled condensate water and the chemical treatment solution may be accomplished by various known methods. A bypass system may be provided for priming the drain pan treatment apparatus, for flushing the system, or for delivering an initial chemical shock treatment if desired.

Presented another way, the invention is a drain pan treatment apparatus in combination with an evaporative air conditioning system having no external water source comprising an air handler unit, cooling coils, a drain pan receiving condensate water formed on the cooling coils, and a drain conduit removing the condensate water from said drain pan, the drain pan treatment apparatus comprising a chemical canister adapted to retain a solid form anti-microorganism chemical; a return conduit adapted to deliver a portion of said condensate water from said drain conduit to said chemical canister, whereby said solid form anti-microorganism chemical is dissolved by said condensate water to create a chemical solution; a treatment conduit adapted to deliver said chemical solution from said chemical canister to said drain pan. The invention may also be described as an improvement in an evaporative air conditioning system having no external water source comprising an air handler unit, cooling coils, a drain pan receiving condensate water formed on the cooling coils, and a drain conduit removing the condensate water from said drain pan, the improvement comprising a drain pan treatment apparatus comprising a chemical canister adapted to retain a solid form anti-microorganism chemical; a return conduit adapted to deliver a portion of said condensate water from said drain conduit to said chemical canister, whereby said solid form anti-microorganism chemical is dissolved by said condensate water to create a chemical solution; a treatment conduit adapted to deliver said chemical solution from said chemical canister to said drain pan.

The invention is also a method of treating condensate water collected in a drain pan of an evaporative air conditioning system having no external water source' to control the growth of micro-organisms in said drain pan, comprising the steps of providing a chemical canister containing a solid form anti-microorganism chemical; recycling a portion of said condensate water from said drain pan into said chemical canister, thereby dissolving said solid form anti-microorganism chemical and creating a chemical solution; delivering said chemical solution to said drain pan in an effective amount to control growth of microorganisms in said drain pan.

DETAILED DESCRIPTION OF THE INVENTION

Figure 1:
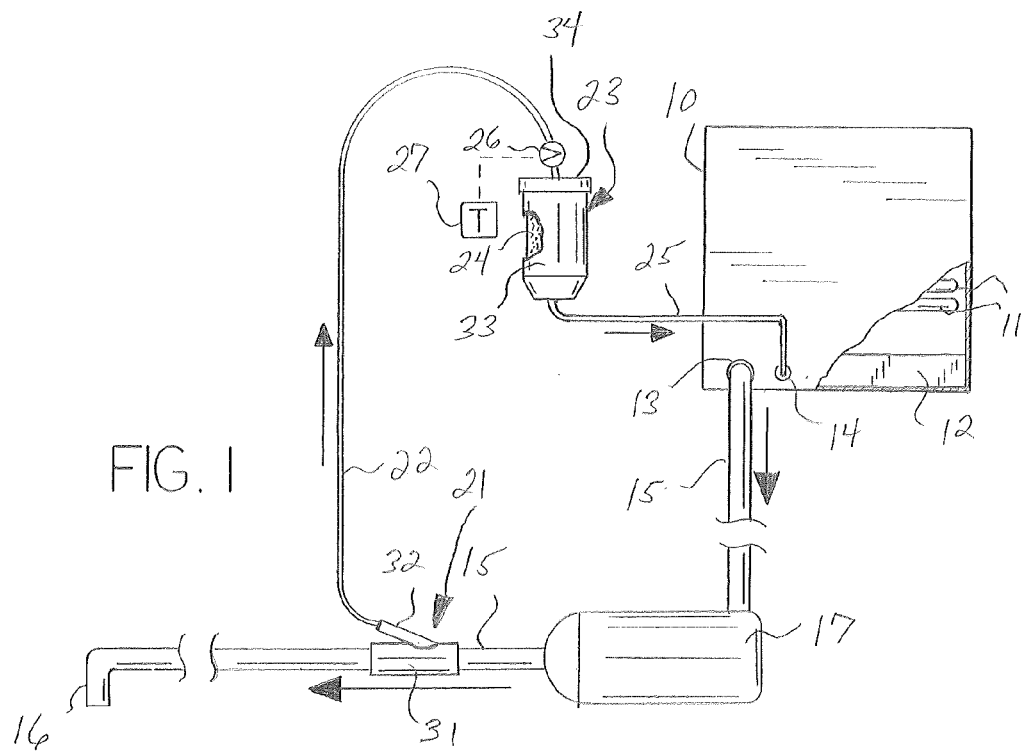
FIG. 1 illustrates one embodiment of the invention.

With reference to the drawings, certain embodiments of the invention will be shown and described. The drawings are presented as illustrative and are not meant to be limiting. In general, the invention is a drain pan treatment apparatus utilizing recycled condensate water to create a chemical solution that is delivered into the drain pan 12 to prevent growth of algae and other microorganisms that may clog the drain port 13 or drain conduit 15, as well as the method of using the apparatus to treat the drain pan condensate liquid, in an evaporative air conditioner system having no external water source delivering water to the air handling unit 10. In an embodiment, the drain pan treatment apparatus comprises a diverter connector 21 that directs a small amount of condensate water from the drain conduit 15 or drain pump 17 into a chemical canister 23 containing a soluble solid chemical 24 to create a chemical solution. The chemical solution is then delivered into the drain pan 12. If the air conditioner system does not include a drain pump 17, then in alternate embodiments a drain pump 17 or a suction pump 18 is added to the system to deliver the condensate water to the chemical canister 23. The chemical canister 23 may comprise for example a removable lid and an internal strainer, the lid sealed by an annular gasket. Proper metering of the recycled condensate water and the chemical treatment solution may be accomplished by various known methods.

An evaporative air conditioning system comprises an air handler unit 10 that contains cooling coils 11. Air is passed over the coils 11 to cool the air for delivery into the building, which results in the condensation of water vapor onto the cooling coils 11. This condensate water drips into a drain pan 12 positioned beneath the cooling coils 11. A drain port 13 is provided in the air handler unit 10 that communicates with the drain pan 12 such that the condensate water can flow from the drain pan 12 into a drain conduit 15 for delivery through an outflow member 16 and onto the exterior ground or into a water sewer system. In some systems the condensate water flows from the drain pan 12 to the outflow member 16 by gravity. In other systems a drain pump 17 is positioned at a point in the drain conduit 15 to force the condensate water, which reaches the drain pump 17 by a gravity feed, to the outflow member 16. No outside water is required for operation of the evaporative air handling unit 10.

Figure 2:
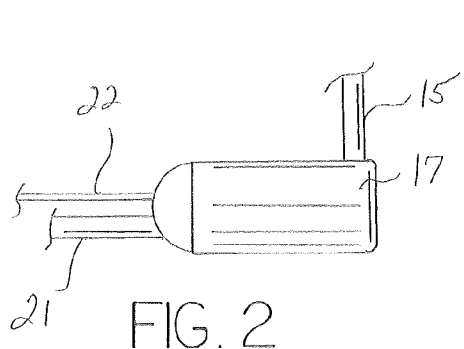
FIG. 2 illustrates an alternate embodiment of the invention, wherein the return line for recycling a portion of the condensate liquid connects directly to the pump.
Figure 3:
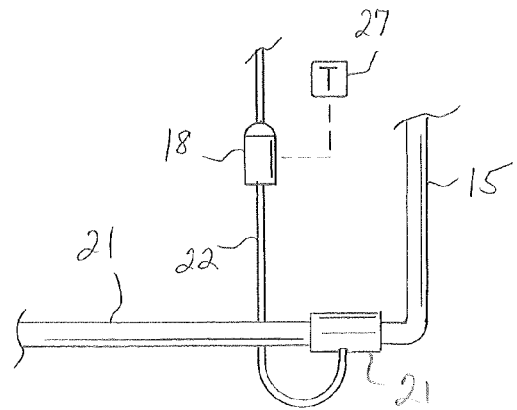
FIG. 3 illustrates an alternate embodiment of the invention, wherein a suction pump is utilized to draw a portion of the condensate water through the return line.

In the embodiment shown in FIG. 1, a diverter connector 21 is positioned in the conduit drain conduit 15 on the discharge side of the drain pump 17. If the system has no drain pump 17, then a drain pump 17 is added to the drain conduit 15 such that a portion of the condensate water is delivered into a return conduit 22. The embodiment of the diverter connector 21 shown in FIG. 1 comprises a tubular main body 31 such that the majority of the condensate water passes through to the outflow member 16. A smaller diverter tube 32 is joined to the main body 31 such that a small amount of condensate water is diverted from the main flow and into a return conduit 22, wherein it is delivered into a chemical canister 23. In an alternative embodiment shown in FIG. 2, the return conduit 22 may connect directly to the drain pump 17 such that there are two discharge conduits for the condensate water. In a third embodiment shown in FIG. 3, the system may or may not include a drain pump 17, but further comprises a suction pump 18 positioned in the return conduit whereby a portion of the condensate water is recycled through the return conduit 22 into the chemical canister 23. A timer 27 may be utilized to operate the suction pump 18 at chosen time intervals.

The drain treatment apparatus may be structured such that creation of the proper concentration of chemical solution and controlled delivery of the chemical solution is accomplished solely through proper sizing of input and output diameters and orifices in the various components, such as the internal diameters of the diverter tube 32, return conduit 22 and/or treatment conduit 25, and/or the inflow and outflow orifices in the chemical canister 23 themselves. Alternatively, electrically powered metering devices may be utilized in known manner, or the apparatus may be valved such that the chemical solution is delivered by manual activation at desired intervals, to control the flow of recycled condensate water into the chemical canister or to control the flow of the chemical solution produced in the chemical canister 23 into the drain pan 12.

As shown in FIG. 1, the chemical canister 23 may comprise a body 33 which is removable from a lid member 34, the body 33 being structured to receive a soluble anti-microorganism (i.e., an algaecide, an anti-microbial, etc.) chemical 24 in solid form, which may be in the form of a bulk solid, tablets, granules, powders, gel solid, etc. The recycled portion of the condensate water is delivered by the return conduit 22 into the chemical canister 23 in a controlled manner. A valve 26, either automatically or manually adjustable, may be disposed in the return conduit 22 to control the amount of condensate water delivered into the chemical canister 23, as shown, or to control the amount of chemical solution delivered into the drain pan 12. A timer 27 may be utilized to control the valve 26. Valve 26 may also be used to flush the chemical canister 23 is needed.

The chemical canister 23 is illustrated as being a unit separated from the air handling unit 10, which enables the drain pan treatment apparatus to be easily retrofitted to existing evaporative air systems. Alternatively, the chemical canister 23 and other components of the drain pan treatment apparatus may be incorporated as part of the air handling unit during manufacture, such as for example by positioning the chemical canister 23 internally to the air handling unit 10 while providing an access door for replenishing the solid chemical when needed.

The condensate water received from the return conduit 22 dissolves a portion of the solid chemical 24 to create a chemical treatment solution. This chemical treatment solution is then delivered from the chemical canister 23 back into the drain pan 12 through a treatment conduit 25, which is preferably connected to an auxiliary port 14 in the air handler unit 10 if present. Alternatively, the treatment conduit 25 may be routed directly into the drain pan 12.

In this manner a supply of chemical treatment solution is created from a solid chemical 24 utilizing recycled condensate water from the evaporative air conditioner system. The solution may be delivered constantly or intermittently in sufficient amount to prevent growth of algae and other microorganisms that might result in blockage of the drain port 13 or drain conduit 15. No external supply of water is required to create the chemical solution. Certain components of the system could be formed of transparent material, such as for example the return conduit 22, chemical canister 23 and/or the treatment conduit 25 so that the user can readily ascertain that the system is functioning properly and that the solid chemical 24 has not been depleted.

It is contemplated that equivalents and substitutions for certain elements set forth and described above may be obvious to those of skill in the art, and therefore the true cope and definition of the invention is to be as set forth in the following claims.

I claim:

1. A drain pan treatment apparatus in combination with an evaporative air conditioning system having no external water source, the evaporative air conditioning system comprising an air handler unit, cooling coils, a drain pan receiving condensate water formed on the cooling coils, and a drain conduit removing the condensate water from said drain pan, the drain pan treatment apparatus comprising:
    a chemical canister adapted to retain a solid form anti-microorganism chemical;
    a return conduit adapted to deliver a portion of said condensate water from said drain conduit to said chemical canister, whereby said solid form anti-microorganism chemical is dissolved by said condensate water to create a chemical solution;
    a treatment conduit adapted to deliver said chemical solution from said chemical canister to said drain pan.

2. The apparatus of claim 1, wherein said return conduit is connected to a diverter connector disposed in said drain conduit.

3. The apparatus of claim 1, further comprising a pump disposed in said drain conduit.

4. The apparatus of claim 2, further comprising a pump disposed in said drain conduit.

5. The apparatus of claim 1, further comprising a suction pump adapted to draw said portion of said condensate water from said drain conduit.

6. The apparatus of claim 5, further comprising a timer to operate said suction pump.

7. The apparatus of claim 1, further comprising a valve to control the flow of said portion of said condensate water into said chemical canister or to control the flow of said chemical solution into said drain pan.

8. The apparatus of claim 7, wherein said valve is manually adjustable.

9. The apparatus of claim 7, wherein said valve is controlled by a timer.

10. In an evaporative air conditioning system having no external water source and comprising an air handler unit, cooling coils, a drain pan receiving condensate water formed on the cooling coils, and a drain conduit removing the condensate water from said drain pan, the improvement comprising a drain pan treatment apparatus comprising:
    a chemical canister adapted to retain a solid form anti-microorganism chemical;
    a return conduit adapted to deliver a portion of said condensate water from said drain conduit to said chemical canister, whereby said solid form anti-microorganism chemical is dissolved by said condensate water to create a chemical solution;
    a treatment conduit adapted to deliver said chemical solution from said chemical canister to said drain pan.

11. The apparatus of claim 10, wherein said return conduit is connected to a diverter connector disposed in said drain conduit.

12. The apparatus of claim 10, further comprising a pump disposed in said drain conduit.

13. The apparatus of claim 11, further comprising a pump disposed in said drain conduit.

14. The apparatus of claim 10, further comprising a suction pump adapted to draw said portion of said condensate water from said drain conduit.

15. The apparatus of claim 14, further comprising a timer to operate said suction pump.

16. The apparatus of claim 10, further comprising a valve to control the flow of said portion of said condensate water into said chemical canister or to control the flow of said chemical solution into said drain pan.

17. The apparatus of claim 16, wherein said valve is manually adjustable.

18. The apparatus of claim 16, wherein said valve is controlled by a timer.

19. A method of treating condensate water collected in a drain pan of an evaporative air conditioning system having no external water source, in order to control the growth of microorganisms in said drain pan, comprising the steps of:
    providing a chemical canister containing a solid form anti-microorganism chemical;
    recycling a portion of said condensate water from said drain pan into said chemical canister, thereby dissolving said solid form anti-microorganism chemical and creating a chemical solution;
    delivering said chemical solution to said drain pan in an effective amount to control growth of microorganisms in said drain pan.

20. The method of claim 19, further comprising the steps of:
    providing a valve or a timer to control the flow of said portion of said condensate water into said chemical canister or to control the flow of said chemical solution into said drain pan.

* * * * *